C. VOLKMANN.
COTTON PICKER.
APPLICATION FILED FEB. 27, 1911.
1,145,174.
Patented July 6, 1915.
2 SHEETS—SHEET 1.
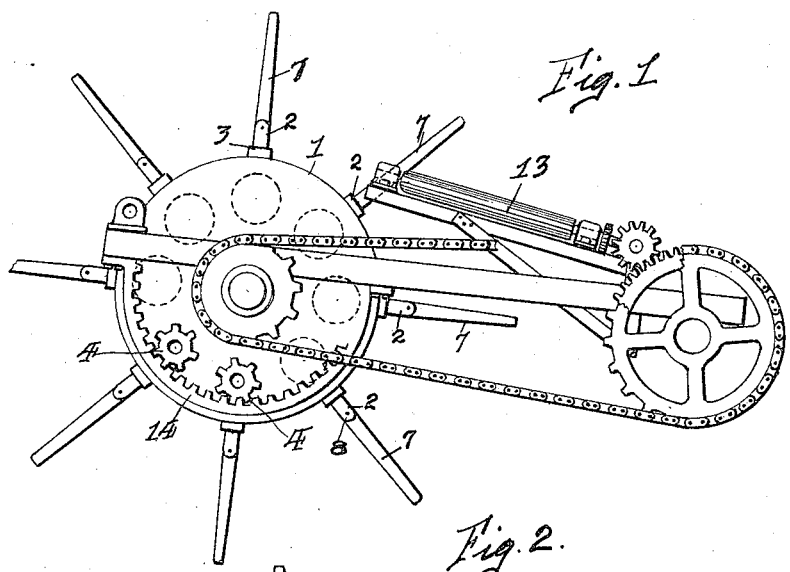
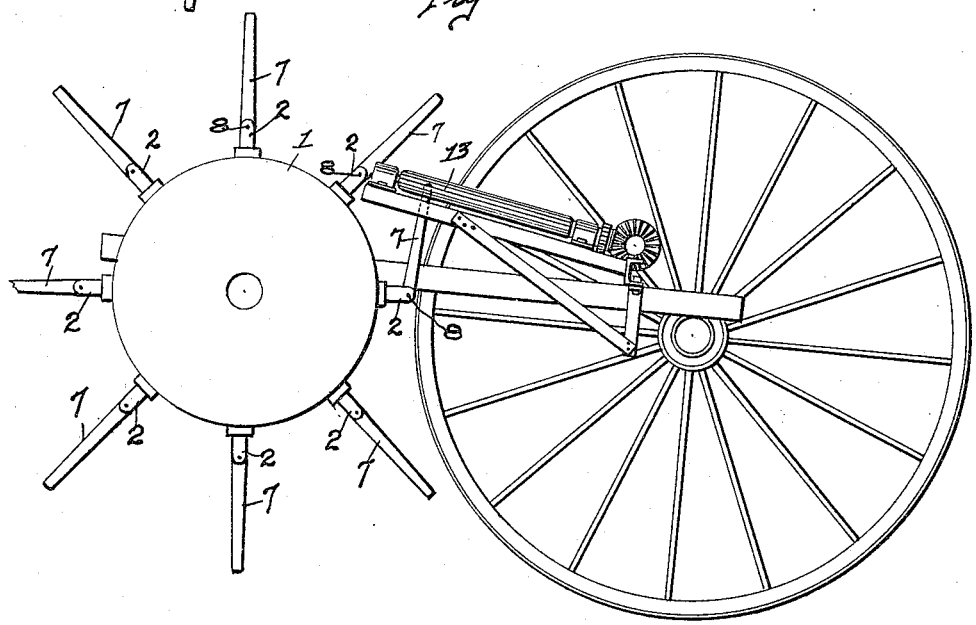
INVENTOR
Charles Volkmann
By Harry Lea Dodson
Attorney
WITNESSES C. VOLKMANN.
COTTON PICKER.
APPLICATION FILED FEB. 27, 1911.
1,145,174.
Patented July 6, 1915.
2 SHEETS—SHEET 2.
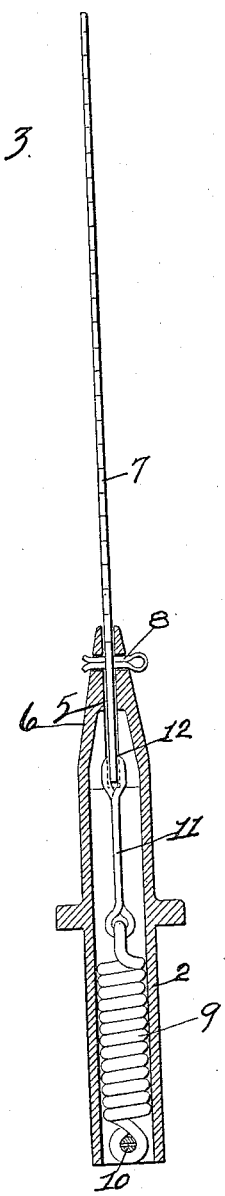
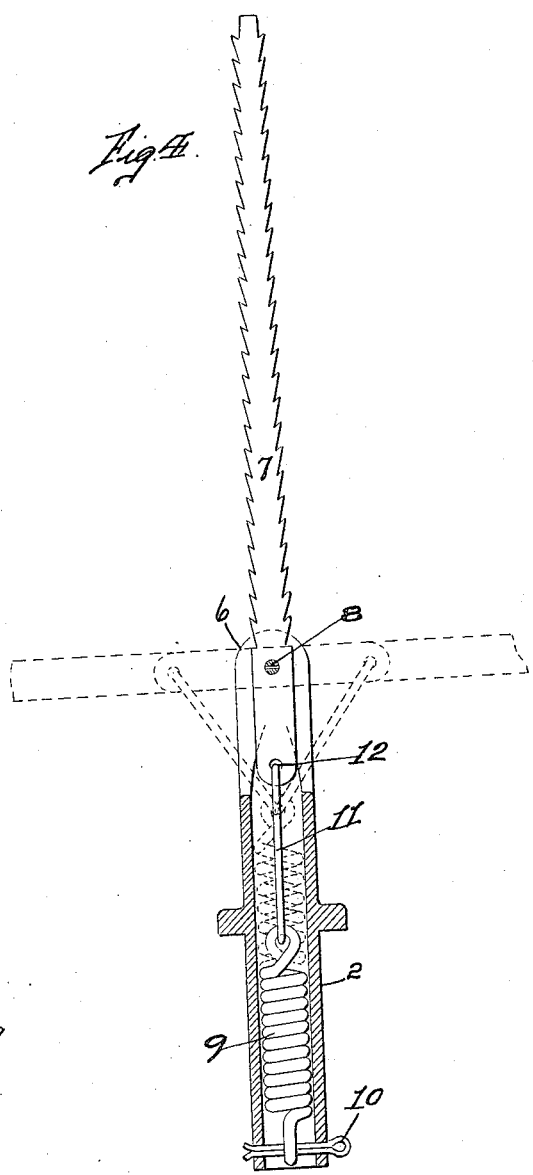

UNITED STATES PATENT OFFICE.

CHARLES VOLKMANN, OF CHICAGO, ILLINOIS.

COTTON-PICKER.

1,145,174.

Specification of Letters Patent.

Patented July 6, 1915.

Application filed February 27, 1911. Serial No. 611,222.

*To all whom it may concern:*

Be it known that I, CHARLES VOLKMANN, a citizen of the United States, residing at Chicago, county of Cook, and State of Illinois, have invented a certain new and useful Improvement in Cotton-Pickers, of which the following is a specification.

My invention relates to that class of cotton pickers in which the cotton is picked from the bolls by a rotating spindle, and more particularly to that class which employs a flat blade having serrations cut upon the edges thereof, the blade being drawn through, or between, a pair of strippers at some period of the operation for the purpose of cleaning the cotton off of the picker.

Pickers of that kind with which I am familiar, provide for the securing of the rotating spindle to a drum which is rotated as the machine is drawn over the field, the strippers engaging the blades at or near the top of the drum, the blade passing through with a downward and outward motion. Where a considerable portion of cotton attaches itself to the blades, there is frequently a tendency for the cotton to clog the teeth and spring the strippers, so that the blade is not perfectly clean when it leaves them.

My invention has for its object to provide a blade which will permit of its being drawn between the strippers in practically a straight line, so that all of the cotton will be cleaned from the teeth.

My means of accomplishing the foregoing object may be more readily understood by having reference to the accompanying drawings which are hereunto annexed and are a part of this specification, in which:

Figure 1 is a view of my improved picker entering the stripper, a fragmentary portion of the frame only being shown, as it comprises no part of my present invention. Fig. 2 is a similar view showing the picker about to leave the strippers. Figs. 3 and 4 are detail views partly in section of the picker and stub.

Similar reference numerals refer to similar parts throughout the entire description.

As shown in the drawings: 1 is a drum upon which is mounted the rotating stub 2, which may be mounted in suitable bearings, as 3, secured to the drum in any suitable or convenient manner; means for rotating said blades may be provided in any desired form, a rack 14 and gears 4, being shown in the drawings. A slot 5 is milled or formed in the outer end 6 of the rotating stub, and the picking-blade 7 is mounted therein, being secured in position by means of a pin or pivot 8, which permits it to rock in said slot or recess. A spring 9 is suitably secured to the stub, by means of a pin 10, and attached through the medium of a rod 11, to an eye 12 formed near the end of the picking blade 7, so that under normal conditions, the picking-blade is held in alinement with the said rotating stub; 13 indicates the strippers which are arranged in pairs, the edges thereof being adapted to engage the flat sides of the picking-blade 7 and strip the cotton therefrom.

Although I have shown and described but a single picker and a pair of blades, it is obvious that any desired number may be employed.

The operation of the device is as follows: The picker, having gathered all the cotton with which it has been brought in contact during the operation of the drum 1, enters the strippers with a forward, downward motion, but if at any time the cotton offers resistance to the stripping portion, (the drum and in turn the stub moving downwardly,) the blade 7 will swing upon the pivot 8, and as the drum continues to rotate it will be drawn downwardly through the strippers in a perfectly straight direction so that the cotton will be drawn off the blade without there being any tendency to tear it or clog the teeth formed on the edges of the blade 7. As soon as the blade 7 leaves the stripper, the operation of the spring will return the blade to its normal position in alinement with the rotating stub and it is ready to again engage the cotton and repeat the picking operation. This time is always predetermined inasmuch as the blade must have left the strippers and been straightened out prior to the engagement of the gears 4 with the rack 14, otherwise the blades would be broken off while whirling around while at right angles to the stub.

Having described my invention what I regard as new and desire to secure by Letters Patent, is:

1. In a cotton picker, a rotating drum, stubs carried by the drum, each of the stubs having a slotted end portion, a picking arm pivotally held between the walls of the slot of each stub, and means in each stub for engaging the respective picking arms for holding the picking arms normally in alinement with the stubs.

2. In a cotton picker, a rotating drum, hollow stubs carried by the drum, each stub having a slotted end portion, a picking arm pivotally held between the walls of the slot of each stub, a coil spring housed by each stub, strippers, said picking arms adapted to move between the strippers and said coil springs adapted to return the respective picking arms to their normal positions after the same have passed between the strippers.

CHARLES VOLKMANN.

Witnesses:
H. L. COWAN,
C. M. BAUMEISTER.